Figure 1:
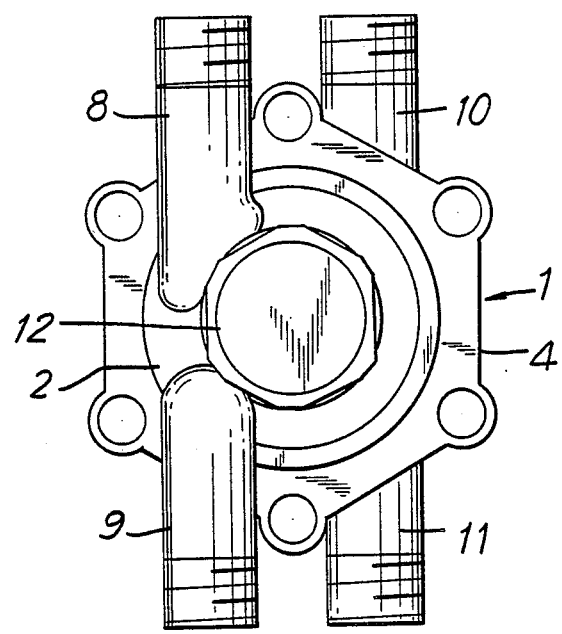

United States Patent [19]

Green et al.

[11] Patent Number: 4,896,691
[45] Date of Patent: Jan. 30, 1990

[54] PRESSURE COMPENSATING DEVICE

[75] Inventors: John W. Green; Ian Moran, both of Hamilton, New Zealand

[73] Assignee: Greens Industries Limited, Hamilton, New Zealand

[21] Appl. No.: 162,208

[22] Filed: Feb. 26, 1988

[51] Int. Cl.[4] ............................................. G05D 11/03
[52] U.S. Cl. .................................... 137/100; 137/114; 137/505.11
[58] Field of Search ............. 137/98, 100, 114, 505.11

[56] References Cited

U.S. PATENT DOCUMENTS

| 1,948,044 | 2/1934 | Myers | 137/100 X |
| 2,009,102 | 7/1935 | Bern | 137/100 |

FOREIGN PATENT DOCUMENTS

| 142812 | 7/1903 | Fed. Rep. of Germany | 137/505.11 |
| 118109 | 9/1980 | Japan | 137/100 |
| 288875 | 6/1953 | Switzerland | 137/100 |

Primary Examiner—Robert G. Nilson
Attorney, Agent, or Firm—Abelman, Frayne Rezac & Schwab

[57] ABSTRACT

The present invention provides a pressure compensating device through which two separate fluid streams flow separated by a diaphragm. The flow of fluid on one side if the diaphragm is unimpeded while flow on the other side of the diaphragm is controlled as a result of movement of the diaphragm caused by pressure differentials.

2 Claims, 3 Drawing Sheets

PRESSURE COMPENSATING DEVICE

This invention relates to pressure compensating devices.

In general diaphragm operated pressure regulators are well known and used in many different applications. There are however some as yet unsolved difficulties with respect to systems dealing with two fluid streams at significantly different pressures, where these are delivered via a common outlet. An example of the problem is perhaps in water supplies where it is common for hot water pressures to be significantly lower than the mains cold water pressures. This is most noticeable when a householder takes a shower and when another appliance or tap is turned on there is a most disconcerting change to water temperature delivered from the shower rose.

There is also available on the market today a range of sophisticated tapware where the tap is in fact a water mixer. Unfortunately these taps cannot operate in the manner for which they are designed unless the water delivered from the hot and cold systems is at substantially equal pressures.

It is an object of the present invention to provide a pressure compensating device which addresses the aforementioned problems and which may have a broader general application.

Further objects and advantages of the present invention will become apparent from the ensuing description which is given by way of example.

According to the broadest aspect of the present invention there is provided a method of controlling pressures between two fluid streams delivering fluid to a common outlet the method comprising the steps of causing the two fluid streams to pass through a common vessel where the streams are separated by a flexible member, and controlling the entry of one of the fluid streams into the vessel on at least one side of the flexible member using valving means which are operatively connected to the flexible member so that the pressure on the controlled side of the flexible member is substantially equal to the pressure on the other side thereof.

According to a further aspect of the present invention an apparatus for performing the aforementioned method comprises a vessel body defining two chambers separated by a flexible member an inlet and outlet for each of the two chambers, at least a first of said chambers including valving means for controlling the entry of fluid into the vessel, said valving means being operatively connected to the flexible member and adapted to operate said valving means to control the ingress of fluid into the first chamber when a pressure differential exists between the first chamber on one side of the flexible member and the second chamber on the other side of the flexible member.

Figure 2:
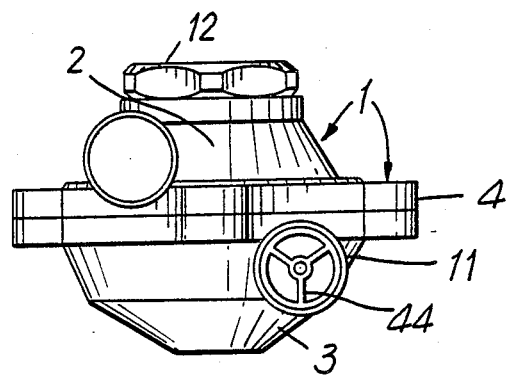
Figure 3:
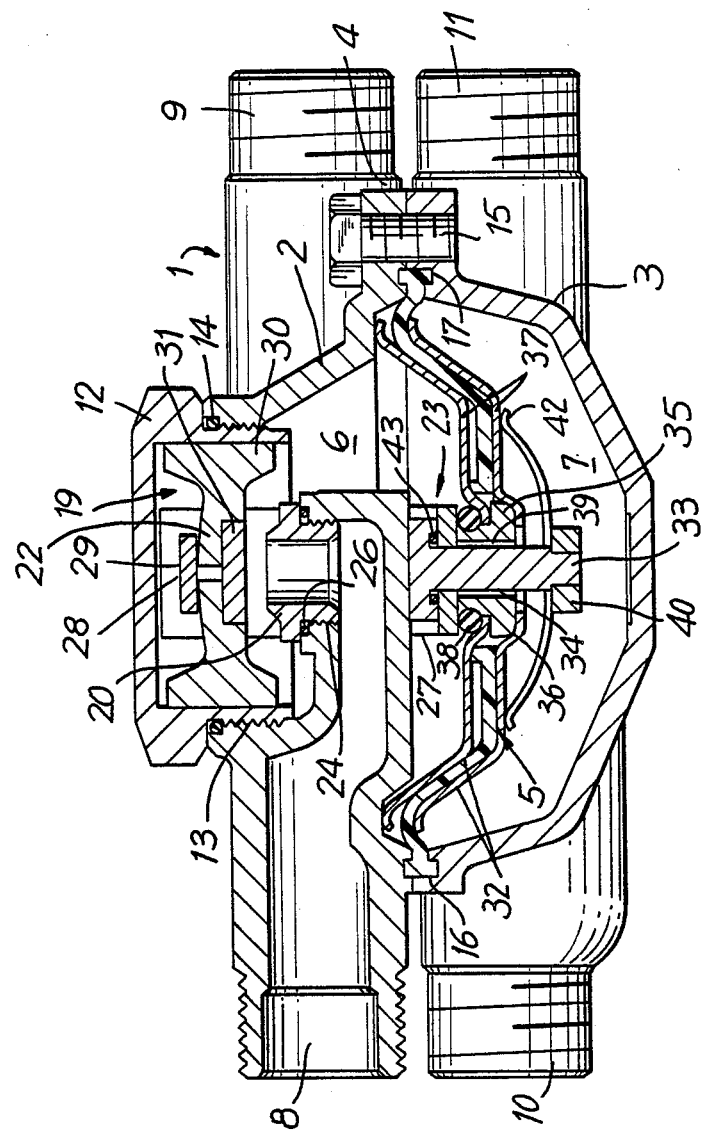
Figure 4:
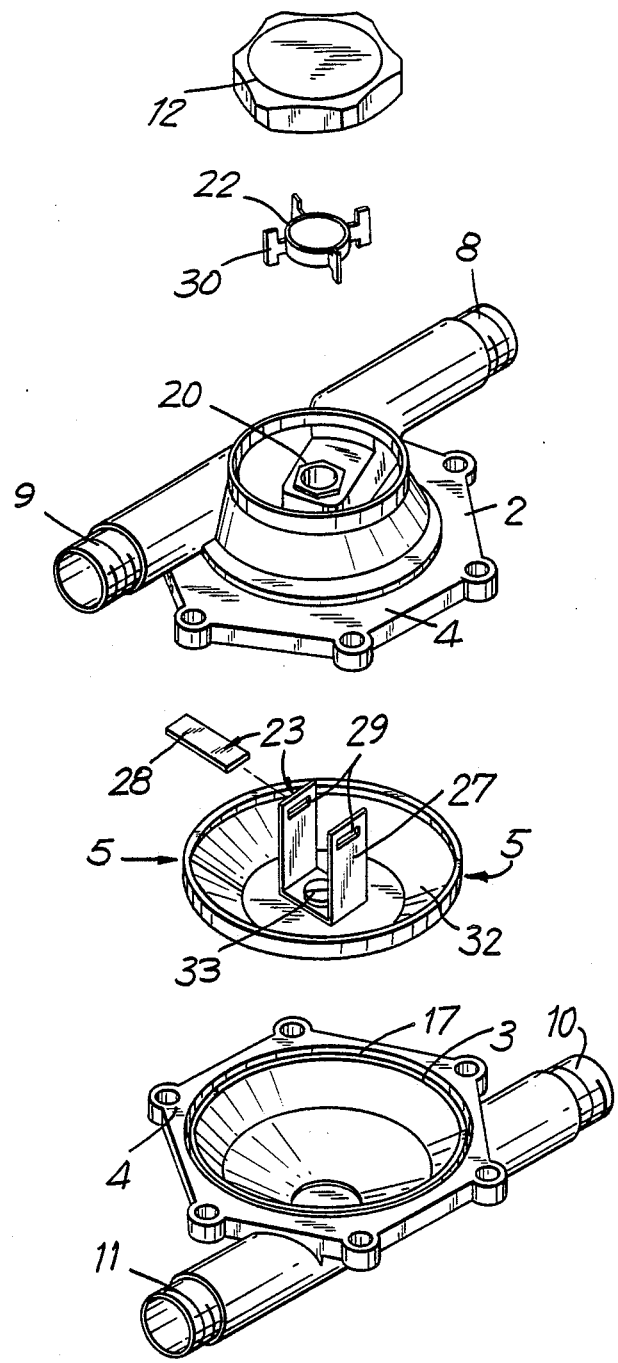

Aspects of the present invention will now be described by way of example only with reference to the accompanying drawings in which:

FIG. 1: is a top view of a pressure compensating device in accordance with one possible embodiment of the present invention, and FIG. 2: is an end view of the pressure compensating device of FIG. 1, and FIG. 3: is a section through the pressure compensating device of FIG. 1, and FIG. 4: is an exploded view showing the relationship of the components of the pressure compensating device of FIG. 1.

With respect to the drawings the pressure compensating device comprises a body generally indicated by arrow 1 which is split into two halves 2,3 about a flange 4. The flange 4 captures a diaphragm generally indicated by arrow 5 (FIGS. 3 and 4) which separates the interiors of the body into a first chamber 6 and a second chamber 7. The first chamber is provided with an inlet 8 and an axially aligned outlet 9. The second chamber 7 is likewise provided with an inlet 10 and an outlet 11. The first chamber is provided with a screw threaded cap 12 which engages with a threaded opening 13 in the top of the body 1. An o-ring seal 14 is located in a recess in the mouth of the threaded opening to provide a fluid tight seal. The ends of the inlets 8 and 10 and the outlets 9 and 11 are threaded.

The pressure compensating device is designed to be installed in a situation where two pipes feed a single appliance. If the pressure compensating device is used to control uneven pressures in a shower system in a dwelling the device is positioned adjacent to the shower mixer valve. The higher pressure pipe (usually the cold water pipe) is connected to the inlet 8 and the lower pressure pipe (usually the hot water pipe) is connected to the inlet 10. The outlets 9 and 11 are connected to the shower mixer unit (not shown).

The two halves 2 and 3 of the body 1 are fastened together by a series of bolts or screws 15 so that an outer flange 16 of the diaphragm 5 locates in complementary grooves 17 of the flange 4.

Apart from the intrusion of the diaphragm 5 the flow of low pressure fluid through the second chamber 7 is unimpeded. The inlet 8 of the half section 2 of the body 1 intrudes into the first chamber where a throttling valve generally indicated by arrow 19 is positioned.

The throttling valve 19 comprises a valve seat 20 mounted on the inner end of the inlet 8, a valve head 22, the valve 19 being operatively connected to the diaphragm 5 via a bridge generally indicated by arrow 23.

The valve seat 20 is a T-section member having a threaded part 24 which engages in a complementary thread of the inlet 8. An o-ring seal 26 is used to prevent leakage via the common thread.

The bridge 23 comprises a U-shaped section 27 fixed to the diaphragm 5 and a removable strap 28 which engages in complementary apertures 29 at the upper ends of the U-shaped section 27 of the bridge 23.

On assembly of the device the upper end of the bridge 23 and the valve head 22 are accommodated within the cap 12 with the star shaped valve head 22 a loose fit within the cap 12 and being positioned above the valve seat 20. The valve head 22 is restrained co-axially in its position above the valve seat 20 by the internal bore of cap 12 with the limbs of the U-shaped section 27 fitting between adjacent legs 30 of the valve head 22. In the example illustrated the valve head 22 is provided with an inbuilt washer 31. The axial travel of the valve head 22 relative to the valve seat 20 is limited by the strap 28. The diaphragm 5 which can be moulded in any suitable durable flexible material such as rubber, nylon or plastics is protected by cup-shaped plates 32 and as aforesaid is connected to the throttling valve 19 by the U-shaped section 27 of the bridge 23, the means of connection being a pin 33. The pin 33 passes through the base of the U-shaped section 27 and into an aperture 34 in a T-section sleeve 35 with a flange 36 of the sleeve 35 being secured by the inner edges 37 of the cup-shaped plates 32 there being in addition an o-ring seal 38 between the sleeve 35 and the undersurface of the U-shaped section 27 of the bridge 23. A passage is provided between the sleeve 35 and the portion of the pin 33 passing through it. Pin 33 is provided with a nut 40 which tightens on a disc spring 42 and the o-ring seal 38 is held firmly against the under surfaces of the U-shaped section 27. A seal 43 is provided at the top end of the pin 33.

Mentioned earlier was the application of the present device to hot and cold water pipes at unequal pressures feeding common appliances such as a shower mixer/rose or a mixer/tap. In this situation cold water at high pressure is fed into the first chamber 6 and hot water at low pressure into the second chamber 7. If at the shower mixer/rose or mixer/tap there is a demand for hot water only the water flows unimpeded through the second chamber 7 slightly reducing pressure in the first chamber 6 with the higher pressures in the first chamber 6 and diaphragm movement holding the valve head 22 on the valve seat 20. If on the other hand cold water is exclusively drawn by the appliance the valve will open to compensate for a pressure drop within the first chamber 6 and cold water will be delivered as required at substantially the same pressure as the hot water in chamber 7.

Where there is a requirement for hot and cold water to be delivered in equal or unequal volumes the throttling valve 19 operates to compensate for unequal water pressures. If for example the appliance was drawing one gallon of hot water per two gallons of cold there is a greater loss of pressure in the first chamber 6 than in the second chamber 7 and the throttling valve 19 opens in proportion to the volumetric flow ratios to compensate for the lower pressures. Because this happens automatically water is delivered to the mixer at substantially equalised pressure. If you take the other example of there being a greater demand for hot water at low pressure than cold at a higher pressure then the valve 19 only opens to the extent that is determined by the drop in pressure in the second chamber containing the hot water.

During normal operating conditions the device may have pressure differentials in the order of 15 kpa to 60 kpa depending on the inlet pressure of thecold water. If some foreign matter should become trapped between the valve head 22 and the valve seat 20 so that cold water was not stopped completely when an associated appliance 15 was turned off the pressure in the first chamber would continue to rise. This would exert excessive forces on the moving parts of the device and diaphragm rupture may occur. To limit the pressure differential to a predetermined maximum value of say 80 kpa a relief valve is incorporated in the device. In accordance with the example illustrated the relief valve is embodied in the means by which the diaphragm 5 is connected to the bridge 23. Excessive pressures in the first chamber 6 will cause the diaphragm 5 and thus the o-ring seal 38 to move away from the U-shaped section 27 of the bridge 23 to allow for fluid to pass down the passage 39 into the second chamber 7. Any excess of water in the second chamber 7 can be discharged through the hot water systems pressure relief vent such discharge from the relief system giving a visual indication of a fault.

Back flow through the device can be protected against either by providing a biasing spring (not shown) to the valve head 22 or by the provision of a non-return valve 44 in the outlet 11.

The pressure relief valve is designed to fit within a 75 mm wall frame and the valve is mounted so that the cap is accessable from the most convenient side in the event maintenance is required.

Whilst the valve has been described in relation to hot and cold water systems and two specific applicances which feed off hot and cold water it is to be appreciated that the valve could be used in other applications.

Aspects of the present invention have been described by way of example only and modifications and additions thereto may be made without departing from the scope of the invention as defined in the appended claims.

What is claimed:

1. A pressure compensating apparatus comprising a vessel body defining two chambers separated by a diaphragm, an inlet an outlet for each of the two chambers, the first of said chambers including valving means for controlling the entry of fluid into the chamber the second chamber allowing the free passage of fluid therethrough, the inlet to said first chamber incorporating a valve opening which is aligned with a removable cap providing access to the valve opening and incorporating a valve seat, a floating valve head positioned over said valve seat said floating valve head being constrained by a bridge which straddles the inlet to the first chamber and which is connected to said diaphragm, movement of the diaphragm controlling the closure of the valve head on the valve seat and the flow of fluid through said first chamber such movement occurring when a pressure differential exists between the first and second chambers.

2. A pressure compensating device as claimed in claim 1, including pressure relief means providing a venting path across the diaphragm in the event that pressure in the first chamber exceeds a predetermined level, and, wherein said bridge is attached to the diaphragm by a pin or bolt and the venting path is provided between the sides of the pin or bolt and an aperture in the diaphragm through which the pin or bolt passes, access to the venting path under normal conditions being blocked by a washer mounted on the pin or bolt the opening of said pressure relief means being controlled by a spring which retains the diaphragm in a closed position under normal conditions.

* * * * *